United States Patent
Park

(10) Patent No.: US 7,965,616 B2
(45) Date of Patent: *Jun. 21, 2011

(54) RECORDING MEDIUM, AND METHOD AND APPARATUS FOR RECORDING AND REPRODUCING DATA ON/FROM RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 1013 days.

This patent is subject to a terminal disclaimer.

(21) Appl. No.: 11/085,134

(22) Filed: Mar. 22, 2005

(65) Prior Publication Data

US 2005/0259560 A1 Nov. 24, 2005

Related U.S. Application Data

(60) Provisional application No. 60/555,410, filed on Mar. 23, 2004.

(30) Foreign Application Priority Data

May 31, 2004 (KR) .................... 10-2004-0039145

(51) Int. Cl.
G11B 7/24 (2006.01)
G11B 20/10 (2006.01)
(52) U.S. Cl. ............... 369/275.3; 369/47.14; 369/53.17; 369/53.2; 714/710
(58) Field of Classification Search ............. 369/275.3
See application file for complete search history.

(56) References Cited

U.S. PATENT DOCUMENTS

| | | | |
|---|---|---|---|
| 5,111,444 A * | 5/1992 | Fukushima et al. ....... 369/53.17 |
| 5,237,553 A | 8/1993 | Fukushima et al. |
| 5,448,728 A | 9/1995 | Takano et al. |
| 5,552,776 A | 9/1996 | Wade et al. |
| 5,815,485 A | 9/1998 | Tanaka et al. |
| 6,115,346 A | 9/2000 | Sims |
| 6,189,118 B1 * | 2/2001 | Sasaki et al. .................. 714/710 |
| 6,330,210 B1 * | 12/2001 | Weirauch et al. .......... 369/30.11 |
| 6,351,788 B1 | 2/2002 | Yamazaki et al. |
| 6,526,522 B1 | 2/2003 | Park et al. |

(Continued)

FOREIGN PATENT DOCUMENTS

EP 0 495 471 1/1992

(Continued)

OTHER PUBLICATIONS

Search Report dated May 15, 2008 for counterpart European Application No. 07111355.9-2223.

(Continued)

Primary Examiner — Aristotelis Psitos
(74) Attorney, Agent, or Firm — Harness, Dickey & Pierce, P.L.C.

(57) ABSTRACT

A recording medium, and a method and apparatus for recording and reproducing data to/from the recording medium are disclosed. The recording medium having a data structure for managing a data area of the recording medium includes at least one physical access control (PAC) cluster, the at least one PAC cluster including information for managing logical overwriting to the recording medium, wherein each PAC cluster includes a PAC header, the PAC header being common to each PAC cluster, and a PAC specific information area, the area including information specific to each PAC cluster, wherein the PAC header includes segment information identifying at least one segment area in a user data area of the recording medium.

20 Claims, 10 Drawing Sheets

U.S. PATENT DOCUMENTS

| | | | |
|---|---|---|---|
| 6,580,684 B2 | 6/2003 | Miyake et al. | |
| 6,615,363 B1* | 9/2003 | Fukasawa | 714/5 |
| 6,621,783 B1 | 9/2003 | Murata | |
| 6,691,209 B1 | 2/2004 | O'Connell | |
| 6,725,200 B1 | 4/2004 | Rost | |
| 6,765,853 B1* | 7/2004 | Ko et al. | 369/53.21 |
| 6,782,488 B1* | 8/2004 | Park et al. | 714/8 |
| 6,912,188 B2 | 6/2005 | Morishima | |
| 6,963,523 B1 | 11/2005 | Park | |
| 7,020,056 B2* | 3/2006 | Lee | 369/47.14 |
| 7,230,893 B2 | 6/2007 | Park | |
| 7,400,564 B2* | 7/2008 | Ko et al. | 369/53.17 |
| 7,478,288 B2* | 1/2009 | Park | 714/710 |
| 7,594,147 B2* | 9/2009 | Park | 714/710 |
| 2002/0036643 A1 | 3/2002 | Namizuka et al. | |
| 2002/0078295 A1 | 6/2002 | Shaath et al. | |
| 2002/0136118 A1 | 9/2002 | Takahashi | |
| 2003/0048731 A1 | 3/2003 | Ozaki | |
| 2003/0137915 A1 | 7/2003 | Shoji et al. | |
| 2003/0210627 A1* | 11/2003 | Ijtsma et al. | 369/53.18 |
| 2003/0212564 A1 | 11/2003 | Sawabe et al. | |
| 2004/0013061 A1 | 1/2004 | Wu | |
| 2004/0174793 A1* | 9/2004 | Park et al. | 369/59.25 |
| 2004/0218488 A1* | 11/2004 | Hwang et al. | 369/44.32 |
| 2004/0246852 A1* | 12/2004 | Hwang et al. | 369/53.17 |
| 2005/0169132 A1 | 8/2005 | Kuraoka et al. | |
| 2005/0195716 A1* | 9/2005 | Ko et al. | 369/53.16 |
| 2005/0207294 A1* | 9/2005 | Park | 369/47.22 |
| 2005/0207318 A1* | 9/2005 | Park | 369/124.07 |
| 2007/0053267 A1 | 3/2007 | Brondijk | |

FOREIGN PATENT DOCUMENTS

| | | |
|---|---|---|
| EP | 1 061 517 | 12/2000 |
| EP | 1 251 508 A2 | 10/2002 |
| EP | 1329888 | 7/2003 |
| EP | 1 381 047 A1 | 1/2004 |
| EP | 1505597 | 2/2005 |
| EP | 1587102 | 10/2005 |
| EP | 1 603 131 A1 | 12/2005 |
| JP | 06-259886 | 9/1994 |
| JP | 11-039801 | 2/1999 |
| JP | 11039801 | 2/1999 |
| JP | 2000-195181 | 7/2000 |
| JP | 2000-322841 | 11/2000 |
| JP | 2002-124037 | 4/2002 |
| JP | 2002-328848 | 11/2002 |
| JP | 2004-030779 | 1/2004 |
| JP | 2004030771 A | 1/2004 |
| JP | 2004039076 A | 2/2004 |
| WO | WO 03/030173 | 4/2003 |
| WO | WO 03/102936 | 12/2003 |
| WO | WO 04/001753 | 12/2003 |
| WO | WO 04/001754 | 12/2003 |
| WO | WO 2004019326 | 3/2004 |
| WO | WO 2004081936 | 9/2004 |
| WO | WO 2005/086598 | 9/2005 |

OTHER PUBLICATIONS

Office Action dated May 14, 2008 for counterpart European Application No. 04808643.3-2223.

"Blu-ray Disc, Rewritable Blu-ray Disc (BD-RE) Multi-Media Command Set Description", Version 0.80, Nov. 9, 2004.

Search Report for corresponding European Application No. 07120323.2 dated May 23, 2008.

European Search Report dated Jul. 30, 2008 corresponding to Application No. EP 07150328.8.

European Search Report dated Aug. 4, 2008 corresponding to Application No. EP 07110264.4.

Australian Office Action dated Jul. 14, 2009 in corresponding Australian application No. 2005222770.

Japanese Office Action dated Mar. 26, 2010 for Japanese Application No. 2007-504881.

Japanese Notice of Allowance dated Nov. 5, 2010 in JP Application No. 2007-504881.

European Office Action dated Nov. 12, 2010 for EP Application No. 05 72 1966.9.

International Search Report dated Nov. 9, 2005.

* cited by examiner

|  |  | BD-RE | BD-R | BD-ROM |
|---|---|---|---|---|
| INFO2 | Reserved | 128 | 128 | 160 |
|  | PAC 2 | 32 | 32 | 32 |
|  | DMA2 | 32 | 32 |  |
|  | CD2 | 32 | 32 | 32 |
|  | BZ3 | 32 | 32 | 32 |
|  |  |  |  |  |
| INFO1 | BZ2 | 32 | 32 | 192 |
|  | Drive Area | 32 | 128 |  |
|  | Reserved | 96 |  |  |
|  | DMA1 | 32 | 32 |  |
|  | CD1 | 32 | 32 | 32 |
|  | BZ1-PAC1 | 32 | 32 | 32 |

FIG. 4

| | Sector in each PAC | Data Byte Position | Description |
|---|---|---|---|
| Common Header for all PACs | 0 | $D_0$ to $D_3$ | PAC_ID |
| | 0 | $D_4$ to $D_7$ | Reserved |
| | 0 | $D_8$ to $D_{11}$ | Unknown PAC Rules |
| | 0 | $D_{12}$ to $D_{13}$ | Reserved |
| | 0 | $D_{14}$ | Entire Disc Flag |
| | 0 | $D_{15}$ | Number of Segments |
| | 0 | $D_{16}$ to $D_{23}$ | Segment_0 |
| | 0 | $D_{24}$ to $D_{31}$ | Segment_1 |
| | 0 | ... | ... |
| | 0 | $D_{264}$ to $D_{271}$ | Segment_31 |
| | 0 | $D_{272}$ to $D_{383}$ | Reserved(not used) |
| | 0 | $D_{384}$ to $D_{2047}$ | Reserved for Specific PAC |
| PAC specific information | 1 to 31 | $D_0$ to $D_{2047}$ | Reserved for Specific PAC |

FIG. 6A

| Area | Control | | Number of bits |
|---|---|---|---|
| | Read | Write | |
| PAC zones 1,2 | Yes<br>No | Yes<br>No | 2 · 10 |
| Individual PACs | Yes | Yes | 2 |
| Control Data zones 1,2 | Yes | Yes | 2 |
| DMA zones 1,2 | No | Yes | 1 |
| Replacement clusters | No | Yes | 1 |
| Data Zone | Yes | Yes | 2 |
| Logical Overwrite | No | Yes | 1 |
| Reserved Area(1,2,3,4,5) | Yes | Yes | 2 · 10 |
| Buffer zone 3 | Yes | Yes | 2 · 0 |
| Buffer zone 2 | Yes | Yes | 2 · 0 |
| Drive Area | No | No | 0 |
| Reserved Area | Yes | Yes | 2 · 6 |
| Buffer Zone 1 | Yes | Yes | 2 · 0 |
| Reserved for future areas | | | 11 · 6 |

Logical Overwrite ( 0b : logical overwrite not allowable
　　　　　　　　　　 1b : logical overwrite allowable

FIG. 6B

| Area | Control | | Number of bits |
|---|---|---|---|
| | Read | Write | |
| PAC zones 1,2 | Yes | Yes | 2 · 10 |
| Individual PACs | Yes | Yes | 2 |
| Control Data zones 1,2 | Yes | Yes | 2 |
| DMA zones 1,2 | No | Yes | 1 |
| Replacement clusters | No | Yes | 1 |
| Data Zone | Yes | Yes | 2 |
| Logical Overwrite | No | Yes | 2 |
| Reserved Area(1,2,3,4,5) | Yes | Yes | 2 · 10 |
| Buffer zone 3 | Yes | Yes | 2 · 0 |
| Buffer zone 2 | Yes | Yes | 2 · 0 |
| Drive Area | No | No | 0 |
| Reserved Area | Yes | Yes | 2 · 6 |
| Buffer Zone 1 | Yes | Yes | 2 · 0 |
| Reserved for future areas | | | 10 · 6 |

Logical Overwrite
- 00b : physical overwirte allowable
- 01b : logical overwrite allowable
- 10b : overwrite not allowable
- 11b : reserved

FIG. 8

| | Sector in each PAC | Data Byte Position | Description |
|---|---|---|---|
| Common Header for all PACs | 0 | $D_0$ to $D_3$ | PAC_ID |
| | 0 | $D_4$ to $D_5$ | Unknown PAC Rules |
| | 0 | $D_6$ | PAC Header Tag |
| | 0 | $D_7$ | Entire_disc_flag |
| | 0 | $D_8$ to $D_9$ | Byte address for the Main Set of Segments |
| | 0 | $D_{10}$ to $D_{11}$ | Number of segments defined in the Main Set(N_M_Segs) |
| | 0 | $D_{12}$ to $D_{13}$ | Byte address for the Additional Set of Segments |
| | 0 | $D_{14}$ to $D_{15}$ | Number of segments defined in the Additional Set(N_A_Segs) |
| | 0 | $D_{16}$ to $D_{23}$ | Reserved for Main Set of Segmenst |
| | 0 | ... | ... |
| | 0 | $D_{264}$ to $D_{271}$ | Reserved for Main Set of Segmenst |
| | 0 | $D_{272}$ to $D_{383}$ | Recorder_ID |
| | 0 | $D_{384}$ to $D_{2045}$ | Reserved for Specific PAC |
| PAC specific information | 1 ~ | $D_0$ ~ | Reserved for Specific PAC |
| | ~ 31 | ~ $D_{2047}$ | Unused part in the specific PAC |

FIG. 9A

| Data Bit Position | Description |
|---|---|
| Bits b15 to b5 | Reserved |
| Bits b4 | Logical Overwrite |
| Bits b3 | PAC read |
| Bits b2 | PAC overwrite |
| Bits b1 | Data Zone read |
| Bits b0 | Data Zone write |

0b : logical overwrite not allowable
1b : logical overwrite allowable

FIG. 9B

| Data Bit Position | Description |
|---|---|
| Bits b15 to b6 | Reserved |
| Bits b4 to b5 | Logical Overwrite |
| Bits b3 | PAC read |
| Bits b2 | PAC overwrite |
| Bits b1 | Data Zone read |
| Bits b0 | Data Zone write |

00b : physical overwrite allowable
01b : logical overwrite allowable
10b : overwrite not allowable
11b : reserved

RECORDING MEDIUM, AND METHOD AND APPARATUS FOR RECORDING AND REPRODUCING DATA ON/FROM RECORDING MEDIUM

This application claims the benefit of the Korean Application No. 10-2004-0039145, filed on May 31, 2004, which is hereby incorporated by reference as if fully set forth herein.

This application claims the benefit of the U.S. Provisional Application No. 60/555,410, filed on Mar. 23, 2004, in the name of inventor Yong Cheol PARK, entitled "PAC usage Indicator in DDS", which is hereby incorporated by reference as if fully set forth herein.

BACKGROUND OF THE INVENTION

1. Field of the Invention

The present invention relates to a high density optical disc, and more particularly, to a recording medium, and a method and apparatus for recording and reproducing data to/from the recording medium, wherein physical access control (PAC) information is recorded.

2. Discussion of the Related Art

Optical discs are widely used for recording a large quantity of data. Among such optical discs, new high density optical media (HD-DVD), such as the Blu-ray Disc (hereinafter referred to as "BD") are under development, which enable long time recording and storing of high definition video and audio data. Currently, a global standard technical specification of the Blu-ray disc, which is considered to be a next generation HD-DVD technology as a data storing solution that significantly surpasses the present DVD, is under development along with other digital apparatuses.

Accordingly, various draft standards related to the BD is under preparation, and in succession to a rewritable Blu-ray disc (BD-RE), various draft standards both for Blu-ray disc writable once (BD-WO), and Blu-ray disc read only (BD-ROM) are also under development. In such course of standardization process, as a method for recording and/or reproducing the BD-RE/R/ROM, recently a physical access control (PAC) method has been under discussion for solving problems caused by a failure of a drive, which supports an existing version, in supporting a new version when it is intended to introduce new functions for the BD-RE/R/ROM into the new version.

SUMMARY OF THE INVENTION

Accordingly, the present invention is directed to a recording medium, and a method and apparatus for recording and reproducing data to/from the recording medium that substantially obviate one or more problems due to limitations and disadvantages of the related art.

An object of the present invention is to provide an effective method of recording physical access control (PAC), which controls a logical overwrite (LOW) in a high density optical disc and, more specifically, in a write-once high density optical disc.

Another object of the present invention is to provide an optical recording and reproducing apparatus recording and managing data by using the PAC.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium having a data structure for managing a data area of the recording medium includes at least one physical access control (PAC) cluster, the at least one PAC cluster including information for managing logical overwriting to the recording medium, wherein each PAC cluster includes a PAC header, the PAC header being common to each PAC cluster, and a PAC specific information area, the area including information specific to each PAC cluster, wherein the PAC header includes segment information identifying at least one segment area in a user data area of the recording medium.

In another aspect of the present invention, a method for recording data in a recording medium includes reading at least one physical access control (PAC) cluster recorded in a predetermined area of the recording medium, the at least one PAC cluster including information for managing logical overwriting to the recording medium, and performing logical overwriting on a pre-recorded area of the recording medium, if the information indicating that logical overwriting is allowable for the recording medium.

In another aspect of the present invention, in a recording medium allocated with a lead-in area, a data zone, and a lead-out area, a method for recording physical access control (PAC) information of the recording medium includes verifying a PAC area within the lead-in area of the recording medium, and recording a PAC cluster within the PAC area, the PAC cluster including information on whether logical overwriting is allowable for the recording medium.

In a further aspect of the present invention, an apparatus for recording and reproducing data on/from a recording medium includes a memory storing a physical access control (PAC) information within the recording medium, and a microcomputer verifying a PAC_ID among the PAC information and, when the verified PAC_ID cannot be identified, controlling logical overwriting in accordance with an Unknown PAC Rule and a Segment information recorded in the PAC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates a PAC structure on the high density optical disc of an embodiment according to the present invention;

FIGS. 6A and 6B illustrate configurations of an "Unknown PAC Rules" field of an embodiment according to the present invention;

FIG. 8 illustrates a PAC structure on the high density optical disc of another embodiment according to the present invention;

FIGS. 9A and 9B illustrate configurations of an "Unknown PAC Rules" field of another embodiment according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
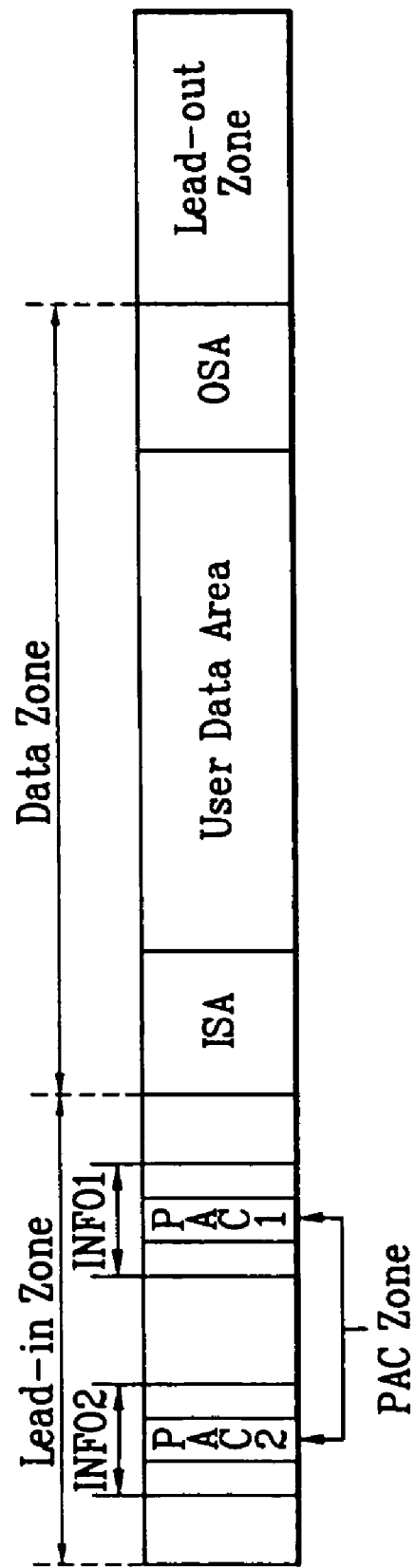
FIG. 1 illustrates physical access control (PAC) zones on a high density optical disc according to the present invention.

FIG. 1 illustrates PAC zones on a high density optical disc according to the present invention. Referring to FIG. 1, the high density optical disc is sectioned and designated as, from an inner circumference to an outer circumference, a lead-in zone, a data zone, and a lead-out zone. For simplicity, the PAC zone assigned to the INFO2 zone is referred to as a PAC2 zone, and the PAC zone assigned to the INFO1 zone is referred to as a PAC1 zone. One of the PAC2 zone and the PAC1 zone has an original PAC recorded thereon, and the other one is a back-up zone for recording a copy of the original PAC. In view of a direction of writing from the inner circumference to the outer circumference of the disc, it is preferable that the original PAC is recorded on the PAC2 zone, and the back-up PAC is recorded on the PAC1 zone. The PAC zone, provided for solving the problems liable to happen when an old version drive fails to detect functions on the disc added from a new version of drive, has an "unknown rule".

The "unknown rule" has rules defined thereon for controlling predictable operations of the disc, i.e., controls starting from basic control of read, write, and the like to linear replacement of a defective zone, logical overwrite, and the like. Accordingly, an area is provided on the disc where the "unknown rule" is applicable thereto, having segments for defining an entire disc, or a certain portion of the disc, which will be described in more detail in a later process. Thus, by defining an area to which the old version drive has access by using the "unknown rule", the new version of optical disc reduces unnecessary access operation of the old version drive.

Moreover, by defining an accessible area on a physical area of the disc for the old version drive to access by using the PAC, a data area having a user data recorded thereon can be protected more robustly, and improper access from an outside of the disc, such as hacking, can be protected. In the meantime, the INFO2 zone and the INFO1 zone having the PAC2 and PAC1 zones therein in the lead-in zone will be reviewed in view of writable characteristics of the high density optical disc.

Figures 2, 3:
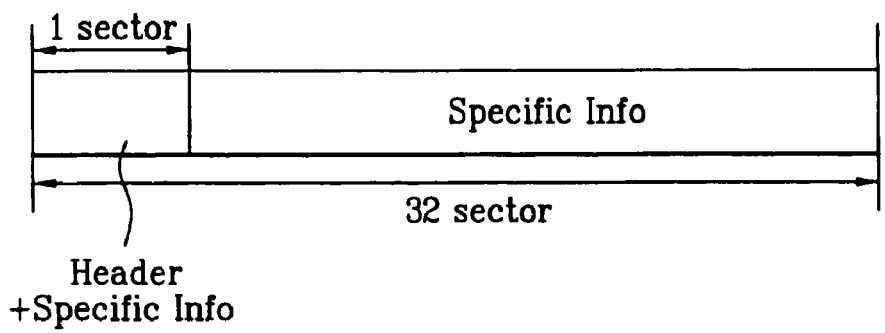
FIG. 2 illustrates configurations of INFO2 zone and INFO1 zone on the high density optical disc according to the present invention.
FIG. 3 illustrates a PAC recorded on the high density optical disc according to the present invention.

FIG. 2 illustrates configurations of the INFO2 zone and the INFO1 zone on the high density optical disc according to the present invention. Referring to FIG. 2, in case of BD-RE of the high density optical disc, the INFO2 zone has 256 clusters including 32 clusters of PAC2 zone, 32 clusters of defect management area (DMA) 2 zone for management of defects, 32 clusters of control data (CD) 2 zone having control information recorded thereon, and 32 clusters of buffer zone (BZ) 3 zone of a buffer zone. The INFO1 zone includes 32 clusters of BZ2 zone of a buffer area, 32 clusters of drive area which is a drive area for storing specific information specific to a drive, 32 clusters of DMA1 zone for managing defects, 32 clusters of CD1 zone for recording control information, and BZ1-PAC1 zone for utilizing as the PAC zone.

In case of the write-once high density optical disc (BD-WO), the INFO2 zone has 256 clusters including a PAC2 zone, a DMA2 zone, a CD2 zone, and a BZ3 zone, each with 32 clusters, and the INFO1 zone has 256 clusters including a BZ2 zone, a DMA1 zone, a CD1 zone, and BZ1-PACI zone, each with 32 clusters, and 128 clusters of drive area. Moreover, in case of the read-only high density optical disc (BD-R), the INFO2 zone has 256 clusters including a PAC2 zone, a CD2 zone, and a BZ3 zone, each with 32 clusters, and the INFO1 zone has 256 clusters including a CD1 zone and BZ1-PACI zone, each with 32 clusters. Thus, the PAC zones of the present invention are assigned to the INFO2 zone and the INFO1 zone in the lead-in zone by 32 clusters respectively according to rewritable characteristics of the high density optical disc. In the PAC zone of 32 clusters, one PAC has one cluster. A structure in which one PAC is recorded at a size of one cluster will be described with reference to FIG. 3.

FIG. 3 illustrates a structure of a PAC recorded on the high density optical disc according to the present invention. Referring to FIG. 3, one PAC of one cluster size (32 sectors) includes a header zone, and a specific information zone specific to an optical disc drive. The PAC header zone has 384 bytes allocated to a first sector of the PAC, for recording various kinds of PAC information, such as information on an "unknown PAC rule" and segments, and the other area of the PAC zone has specific information specific to the optical disc drive which is called "known rule" recorded thereon.

A detailed structure of the PAC recorded in above structure will be described with reference to FIG. 4. For simplicity, in the description of the present invention, particular fields of the PAC that require more detailed description will refer to drawings that illustrate the fields. FIG. 4 illustrates a structure of a PAC on the high density optical disc of an embodiment according to the present invention. Referring to FIG. 4, as described above, the PAC includes a header portion applicable to all PACs (i.e., Common Header for all PACs), and an area having specific information (i.e., PAC Specific Information) specific to the drive recorded thereon.

In turn, the header portion includes 4 bytes of "PAC_ID", 4 bytes of "Unknown PAC Rules", 1 byte of "Entire Disc Flag", 1 byte of "Number of Segments", and 32 segments "Segment_0~Segment_31" each with 8 bytes. The "PAC_ID" is a field for providing the present PAC status and identification codes, wherein if the "PAC_ID" has '00 00 00 00' bits, the "PAC_ID" indicates that the present PAC is not used, if the "PAC_ID" has 'FF FF FF FE' bits, the "PAC_ID" indicates that the present PAC zone is not available for use due to reasons of defects or the like, and if the "PAC_ID" has 'FF FF FF FF' bits, the "PAC_ID" indicates that the present PAC zone is available for use again even if the PAC zone is used in the past.

Moreover, by recording the "PAC_ID" in bits agreed beforehand, such as '54 53 54 00' bits, the "PAC_ID" is used as a code for determining if the disc is one that the present drive can make free access. More specifically, if the present drive does not know the "PAC_ID" applied thus, determining that this is a case when the present drive cannot understand the present PAC under a reason of version mismatch, or the like, the '54 53 54 00' bits are used as a code requiring reference to information recorded on the "Unknown PAC Rules" field.

In the meantime, the "Entire Disc Flag" field in FIG. 4 is used as a field for informing that the PAC is applicable to an entire area of the disc, and the "Number of Segments" field is a field representing a number of segment area the PAC is applicable thereto. Maximum 32 segments can be allocated to one PAC, and information on the allocated segments is written on fields of "Segment_0" to "Segment_31" each with 8 bytes. Each of the "Segment_0~Segment_31" fields has the first PSN and the last PSN of the allocated segment area recorded thereon.

Figure 5:
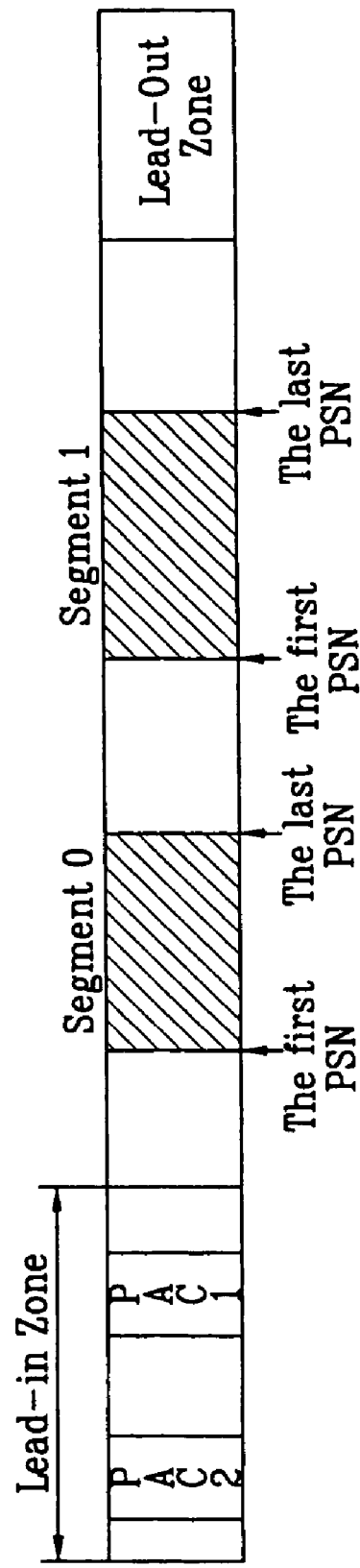
FIG. 5 illustrates segment zones on the high density optical disc according to the present invention.

The segment will be described in more detail with reference to the accompanying drawings. FIG. 5 illustrates segment zones on the high density optical disc according to the present invention. Referring to FIG. 5, if required, there can be maximum 32 segment areas on the high density optical disc of the present invention, for applying the PAC thereto starting from "Segment_0" in succession. In this case, by writing the first PSN which indicates a starting position of the allocated segment area, and the last PSN which indicates the last position of the allocated segment area on "Segment" fields of PAC2 and PAC1 zones, the optical disc drive is made to know positions of the segment areas. None of the plurality of allocated segments overlap, and the starting and last positions are designated at boundaries of the clusters.

As described above, the "Unknown PAC Rules" field is used as a field that designates an operation range of the drive that cannot understand the present PAC, which will be described with reference to FIGS. 6A and 6B. FIGS. 6A and 6B illustrate configurations of an "Unknown PAC Rules" field of an embodiment according to the present invention. Referring to FIG. 6A, by using the "Unknown PAC Rules" field, a plurality of areas within the optical disc can be determined whether the areas can be controlled or not. Herein, the "Area" within the table represents a controllable area within the optical disc. The "Control" area shows the controlled status of reading/writing (or recording/reproducing), and the "Number of bits" represents the number of bits required for the control. Moreover, the bits added to the "Number of bits" shows that the optical disc is a dual-layer optical disc having two recording/reproducing sides.

For example, a "PAC zones 1, 2" field may indicate that reading and writing can be controlled in the entire PAC zone. A "DMA zones 1, 2" field may indicate that writing can be controlled in the defect management area. Moreover, a "Replacement Clusters" field may indicate that writing for a replacement area in the defect area can be controlled. Furthermore, a "Data Zone" field may indicate that reading and writing can be controlled in the data zone, and a "Logical Overwrite" field may indicate that logical overwriting can be controlled. Evidently, the control of writing may be applied to a physically recordable high density optical disc (BD-RE, BD-R). And, similarly, the control of writing in a replacement area of the defect area may be applied to a physically recordable high density optical disc (BD-RE, BD-R). Accordingly, it is apparent that the description of the present invention should be understood in accordance with the recording (or writing) characteristics of the high density optical disc.

By using the above-described method, the "Unknown PAC Rules" field can be used to enable a controllable area to be designated on the optical disc when using a drive of a mismatching version. In addition, the application of the above-described method is not limited only to the drive of a mismatching drive and can also be used for controlling access (i.e., controlling recording/reproducing or controlling writing/reading, both terminology are used in the description of the present invention) of a specific area in a physical area on the optical disc in accordance with the selection of the user. Accordingly, among the control of access for a plurality of allocatable areas on the disc, methods for controlling logical overwriting and controlling access of a logically overwritten area within the write-once high density optical disc will now be described in detail. The method for controlling logical overwriting will first be described, and the descriptions of the method for controlling access of the logically overwritten area and a method for controlling logical overwriting by using a "Logical Overwrite" field will then follow. (Descriptions will be made will be made with reference to FIGS. 6A, 6B, and 7 whenever required.)

Figure 7:
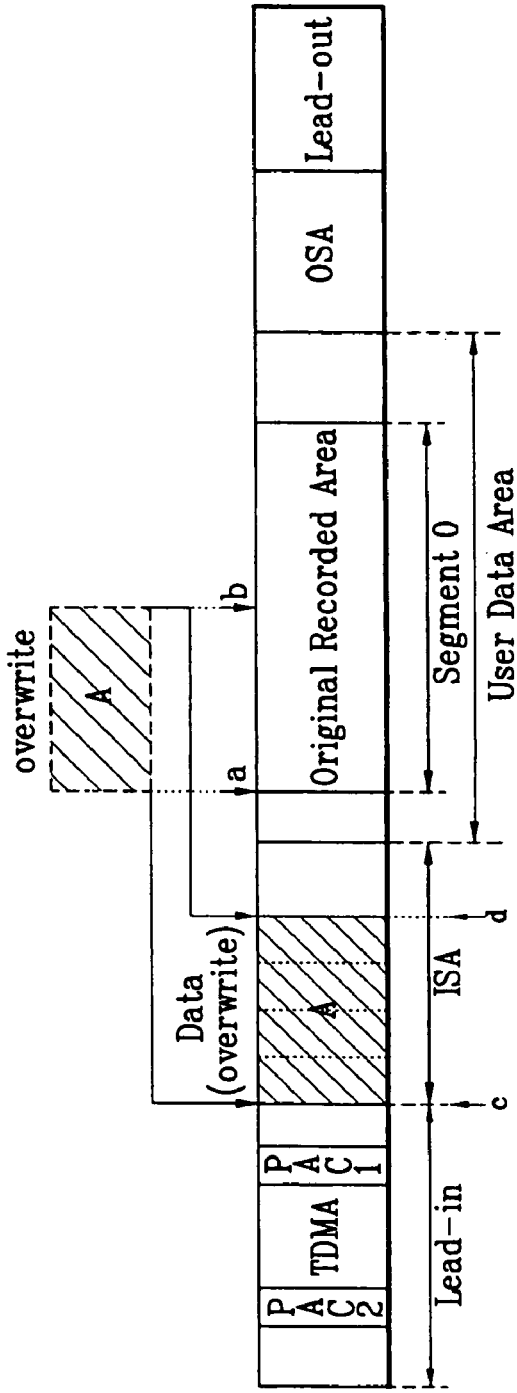
FIG. 7 illustrates a logical overwriting method of a write-once high density optical disc according to the present invention.

FIG. 7 illustrates a logical overwriting method of a write-once high density optical disc according to the present invention. Referring to FIG. 7, the write-once high density optical disc is allocated with a lead-in zone, an inner spare area (ISA), an outer spare area (OSA), and a lead-out zone. In the above-described write-once optical disc (BD-WO), the record management information according to the recording of data may be updated several times, as requested, during the usage of the optical disc. Therefore, the lead-in area of the optical disc includes a temporary disc management area (TDMA), wherein management information of the optical disc that can be updated several times is recorded. The TDMA is recorded in a temporary defect list (TDFL). The TDFL includes a list of defects consisting of a plurality of defect list (DFL) entries, wherein management information such as position information of actual defect areas or overwritten areas is recorded.

In the optical disc having the above-described structure, when an original recorded data area exists within the data zone, the corresponding area cannot be physically overwritten (i.e., overwriting is not allowable) due to the characteristics of the write-once optical disc. However, when a writing command requesting writing to be performed in area a-b (i.e., the original data recorded area) in accordance with a user request, a method of replacement recording the data in another area within the data zone is applied. Therefore, a host may give (or make) a writing command regardless of an original recording of data on a specific area within the disc. Thus, a user may use the write-once optical disc as a re-writable optical disc. This is differentiated from the physical overwriting and will be referred to as a logical over-write (LOW) method.

More specifically, when performing writing in area a-b, as shown in FIG. 7, since area a-b is a recording completed area (or an original data recorded area), data cannot be overwritten in the corresponding area (i.e., area a-b). However, in this case, the data is replacement recorded in a spare area (i.e., area c-d) within the data zone. And so, the corresponding management information is recorded as a TDFL information within the TDMA of the optical disc, thereby completing the writing process. In this case, the necessary overwriting management information is treated identically as a consecutive re-allocation defect (CRD) type. In other words, the physically recording completed area a-b is considered to be a defect area, and the data that is to be recorded in the defect area a-b is replacement recorded in a spare area.

In case of the CRD type, the management information that is recorded in the TDMA can be expressed (or described) by using two DFL entries. As shown in FIG. 7, information on replacement recording is recorded in a "status 1" field for one of the two entries as a type information for each entry. (For example, '0000' represents a DFL entry of a Re-Allocation Defect (RAD) type or a Consecutive Re-allocation Defect (CRD) type, wherein replacement recording is normally completed. And, '0001' represents a DFL entry of a Non-Reallocatable Defect (NRD) type, wherein a replacement area is not designated even though the corresponding area is a defect area.) A position information of a cluster having a defect is recorded in a "Defective Cluster first PSN" field. Herein, the position information is recorded as a first physical sector number (PSN) of the corresponding cluster.

In a "status 2" field, just as in the "status 1" field, information on each DFL entry type and characteristic is recorded. (For example, '0000' represents when a defect occurs in one cluster, '0001' represents a start (or beginning) of a plurality of consecutive defective clusters, and '0010' represents an end of the plurality of consecutive defective clusters.) In addition, a position information of an area in which a defect area is replacement recorded in a spare area is recorded in a "Replacement Cluster first PSN" field. Herein, the position information is recorded as a first physical sector number (PSN) of the corresponding cluster. Furthermore, by using the other entry, type information for each DFL entry is expressed (or described or written) in "status 1" and "status 2" fields. (Most particularly, a '0010' bit indicating an end of a plurality of consecutive defective clusters and replacement clusters is recorded in the "status 2" field.) A first physical sector number (PSN) of a last cluster among the position information of a cluster having a defect is recorded in a "Defective Cluster first PSN" field. And, a first PSN of a last cluster among the position information of a replacement recorded area within a spare area of the defect area is recorded in "Replacement Cluster first PSN" field.

In an example of the method for logical overwriting by using an entry format according to the present invention having the above-described structure will now be described with reference to FIG. 7. '0000' representing that overwriting has been performed is recorded in the "status 1" field of a first DFL entry (DFL entry 1), and 'a' which is the first PSN of a defective cluster is recorded in the "Defective Cluster first PSN" field. Moreover, '0001' representing a start (or beginning) of consecutive defective clusters is recorded in the "status 2" field, and 'c' which is the first PSN of a replacement recorded position of the defect area replacement recorded within the spare area is recorded in the "Replacement Cluster first PSN".

Furthermore, '0000' representing that replacement recording is completed is recorded in the "status 1" field of a second DFL entry (DFL entry 2), and 'b' which is the first PSN of a last cluster among the defective clusters is recorded in the "Defective Cluster first PSN field". Moreover, '0010' representing an end of the consecutive defective clusters is recorded in the "status 2" field, and 'd' which is a first PSN of a last cluster of a replacement recorded position of the defect area replacement recorded within the spare area is recorded in the "Replacement Cluster first PSN" field. Therefore, in accordance with a user request that may be made in a later process, when a host requests reproduction of the area a-b, the area c-d is reproduced in replacement after referring to the above-described information recorded in the TDMA.

In the above-described logical overwriting method according to the present invention, it is apparent that the original recorded area is an area allocated as a segment area (e.g., segment 0). Therefore, when an overwritten area is allocated as a segment area, as described above, or when an unknown PAC rule for an entire disc area is applied, although the data that is to be physically recorded in area a-b is replacement recorded in area c-d, the host identifies the data as being overwritten in area a-b. Therefore, area c-d is defined to be treated identically as the contents of access control, which is controlled by the PAC applied to the segment 0 area. (Herein, area a-b wherein data is recorded is referred to as an area for logical overwriting, and area c-d is referred to as a logically overwritten area for simplicity of the description.)

More specifically, for example, when a current drive is unaware of the identified PAC_ID, such as when a disc having data recorded from a higher drive version is loaded in a lower drive version, a segment area (or the entire disc), which is an area on the disc having the unknown PAC rule applied thereto, includes the logically overwritten area. Therefore, even though the logically overwritten data is physically recorded in a separate spare area other than the segment area, the logically overwritten area is treated identically as the contents of access control, which is controlled by the unknown PAC rule of the corresponding segment area.

Meanwhile, according to the present invention, when using a mismatching version drive, the information limiting the logical overwriting is defined in the unknown PAC rule of the PAC, which will now be described with reference to FIGS. 6A and 6B. First of all, referring to FIG. 6A, the information limiting the logical overwriting is recorded by using the "Logical Overwrite" field. Accordingly, by allocating 1 bit in the "Logical Overwrite" field, bit '1' represents that logical overwriting is allowable in an original recorded area on the disc, and bit '0' represents that logical overwriting is not allowable in an original recorded area. Therefore, when the current drive cannot identify the PAC_ID of the inserted optical disc, the logical overwriting is controlled by referring to the bit recorded in the "Logical Overwrite" field of the unknown PAC rule.

FIG. 6B illustrates an example of two bits being allocated for the "Logical Overwrite" field. Referring to FIG. 6B, two bits are allocated in the "Logical Overwrite" field. Bit '00' represents that physical overwriting is allowable, and bit '01' indicates that logical overwriting is allowable in the original recorded area on the optical disc. Moreover, bit '10' represents that logical overwriting is not allowable in the original recorded area on the optical disc, and bit '11' is left as a reserved bit for future usage. More specifically, apart from the overwriting in the write-once high density optical disc, the example of FIG. 6B has also taken into account the physical overwriting in a re-writable high density optical disc (BD-RE).

FIG. 8 illustrates a PAC structure on the high density optical disc of another embodiment according to the present invention. Referring to FIG. 8, the PAC structure of another embodiment of the present invention includes a common header part and a specific information area of a specific drive. Herein, the common header part includes 4 bytes of a "PAC_ID" field, 2 bytes of a "Unknown PAC Rules" field, 1 byte of a "PAC Header Tag" field, 1 byte of an "Entire_disc_flag" field, 2 bytes of a "Byte address for the Main Set of Segments" field, 2 bytes of a "Number of Segments defined in the Main Set (N_M_Segs)" field, 2 bytes of a "Byte address for the Additional Set of Segments" field, and 2 bytes of a "Number of Segments defined in the Additional Set (N_A-

_Segs)" field. Furthermore, the specific information area of the specific drive includes an "Unused Part in the specific PAC" field.

In the above-described PAC structure, 2 bytes are allocated for the "Unknown PAC Rules" field, and a Main segment set and an Additional segment set are included. More specifically, the Additional segment set is reserved for when more segment areas are to be additionally allocated in addition to the 32 segments areas. For this, the number of main segments defined by the "Number of Segments defined in the Main Set (N_M_Segs)" field is recorded, and its starting position is recorded in the "Byte address for the main Set of Segments" field. In other words, the information recorded in the "Byte address for the main Set of Segments" field acts as a pointer of the defined main segment area. Moreover, the number of additional segments defined by the "Number of Segments defined in the Additional Set (N_A_Segs)" field is recorded, and its starting position is recorded in the "Byte address for the Additional Set of Segments" field. In a PAC area recorded in the size of one cluster, the additional segment area includes an unused part in the specific PAC, which is allocated in the N_A_Segs area. When using the above-described PAC structure, the additional segment areas may also be managed, as requested, in addition to the 32 segment areas.

As described above, the 2 bytes of the "Unknown PAC Rules" field is used as a field designating the operation range of the drive that cannot understand the current PAC, which will be described in detail with reference to FIGS. 9A and 9B. More specifically, FIGS. 9A and 9B illustrate configurations of an "Unknown PAC Rules" field of another embodiment according to the present invention. First of all, referring to FIG. 9A, the "Unknown PAC Rules" field indicates detailed contents of controlling reading/writing on the PAC area by using 1 bit, controlling reading/overwriting on the PAC area by using 1 bit, and controlling logical overwriting according to the present invention by using 1 bit.

More specifically, 1 bit is allocated for the logical overwriting, and bit '1' indicates that logical overwriting is allowable, and bit '0' represents that logical overwriting is not allowable. Furthermore, referring to FIG. 9B, the "Unknown PAC Rules" field is allocated with 2 bits for the "Logical Overwrite" field. Herein, bit '00' represents that physical overwrite is allowable, and bit '01' indicates that logical overwriting is allowable. Moreover, bit '10' represents that logical overwriting is not allowable, and bit '11' indicates a reserved bit reserved for future usage. The above-described example also applies to the re-writable high density optical disc (BD-RE).

Figure 10:
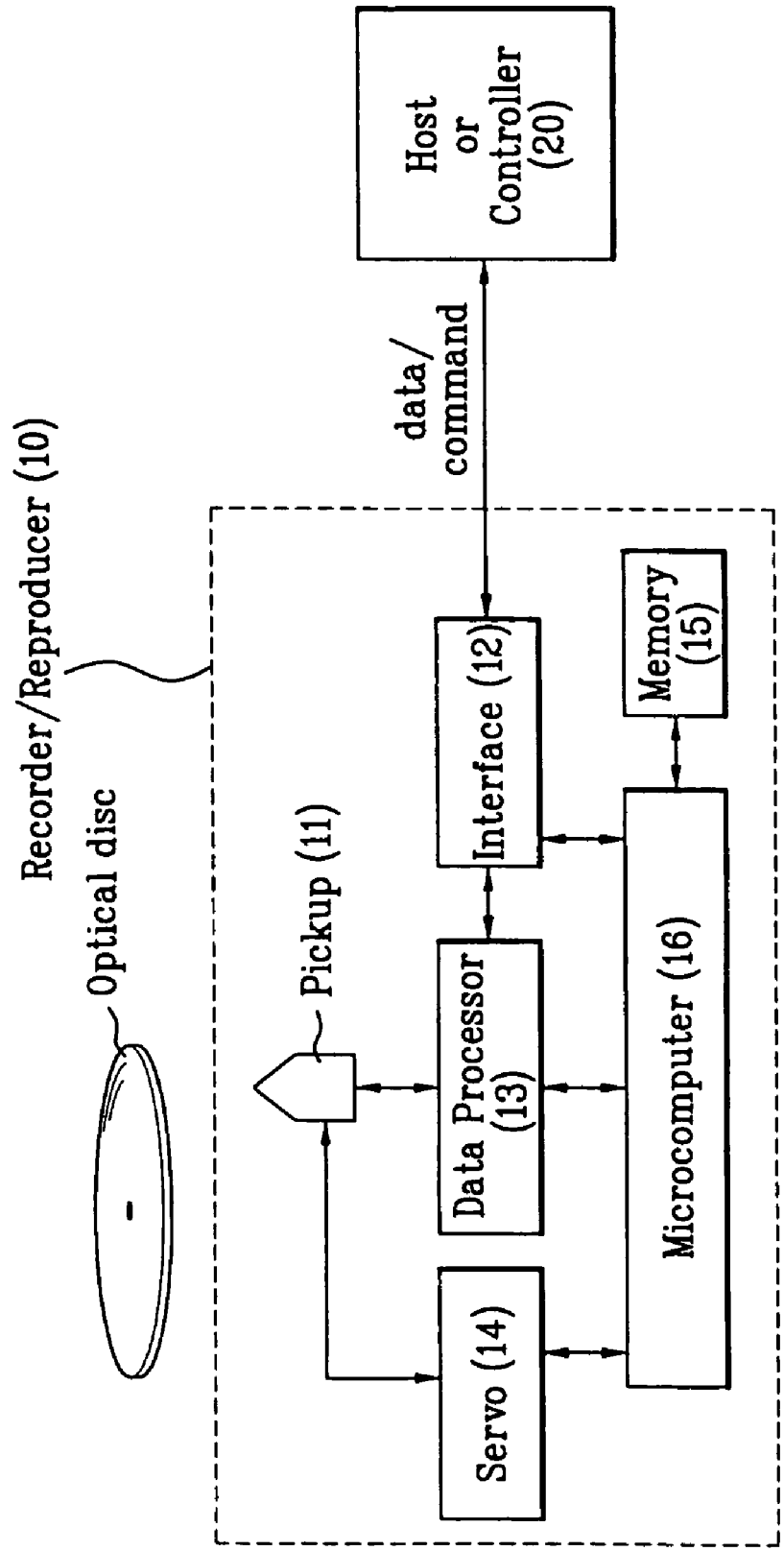
FIG. 10 illustrates a block diagram of an optical recording and/or reproducing apparatus according to the present invention.

FIG. 10 illustrates a block diagram of an optical recording and/or reproducing apparatus according to the present invention. Referring to FIG. 10, the optical recording and/or reproducing apparatus includes a recording/reproducing device 10 for performing recording/reproduction on the optical disc, and a host, or controller 20 for controlling the recording/reproducing device 10. (Herein, the recording/reproducing device 10 is often referred to as an "optical disc drive", and both terms will be used in the description of the present invention).

More specifically, the host 20 gives a writing or reproduction order to write or reproduce to/from a particular area of the optical disc to the recording/reproducing device 10, and the recording/reproducing device 10 performs the recording/reproduction to/from the particular area in response to the order from the host 20. The recording/reproducing device 10 includes an interface unit 12 for performing communication, such as exchange of data and order, with the host 20, a pickup unit 11 for writing/reading a data to/from the optical disc directly, a data processor 13 for receiving signal from the pickup unit 11, and recovering a desired signal value, or modulating a signal to be written into a signal able to be written on the optical disc, and forwarding, a servo unit 14 for controlling the pickup unit 11 to read a signal from the optical disc accurately, or write a signal on the optical disc accurately, a memory 15 for temporary storage of various kinds of information including management information, and data, and a microcomputer 16 for controlling various parts of the recording/reproducing device 10.

A method for recording a PAC on a high density writable optical disc by using the optical recording and/or reproducing apparatus will now be described. Upon inserting the optical disc into the optical recording and/or reproducing apparatus, all management information is read from the optical disc and stored in the memory of the recording/reproducing device 10, for use at the time of recording/reproduction of the optical disc. Herein, if the user desires to write on a particular area of the optical disc, the host 20, which consider such desire of the user as a writing order, provides information on a desired writing position to the recording/reproducing device 10, along with a set of data that is to be written.

Then, the microcomputer 16 in the recording/reproducing device 10 receives the writing order, determines if the area of the optical disc in which the host 20 desires to write is a defective area or not from the management information stored in the memory 15, and performs data writing according to the writing order from the host 20 on an area which is not the defective area. In this case, if it is determined that the writing on an entire disc or on the particular area includes new features which a related art recording/reproducing device is not provided with, leading the related art recording/reproducing device to fail to sense, or if it is intended to restrict functions, such as writing or reproducing to/from the particular area of the disc according to requirements requested by the user, the microcomputer 16 of the recording/reproducing device 10 writes control information of the area on the PAC zone on the disc as "Unknown PAC rule".

At this point, when the PAC recorded as described above is the control information for the entire disc area, the "Entire Disc Flag" field is recorded. And, when at least one segment area, which is a constant area within the disc, is allocated so as to control the access of the entire area, the number of allocated segment areas is recorded in the "Number of Segment" field, and control information as to whether access is allowed is recorded in the "Data Zone" field of the "Unknown PAC Rules" field. Moreover, when individual control is to be made for each of the segment areas, the contents of control and position information of the corresponding segment area is recorded in the "Segment" field. More specifically, when the host 20 wishes to record the contents of controlling the logical overwriting for the mismatching drive version, the corresponding contents of control is recorded in the "Logical Overwrite" field of the "Unknown PAC Rules" field. Herein, the PAC is recorded in the INFO2 zone of the PAC2 zone in the size of one cluster, and the PAC and the copy version of the PAC (or Copy PAC) is recorded in the INFO1 zone of the PAC1 zone for backup usage.

Accordingly, the microcomputer 16 provides position information of the area the data is written thereon, or the PAC zone, and the data to the servo unit 14 and the data processor 13, so that the writing is finished at a desired position on the optical disc through the pickup unit 11. Meanwhile, a method for recording and/or reproducing the high density optical disc having the PAC information written by above method will be described. Upon inserting an optical disc into the optical recording and/or reproducing apparatus, all management information is read from the optical disc, and stored in the memory of the recording and reproducing device 15, for use at the time of recording and reproduction of the optical disc. The information in the memory 10 includes position information of various zones inclusive of the PAC zone on the disc. Then, a PAC_ID field of the PAC is examined, for verifying if the PAC_ID of the PAC of the PAC zone is a sensible PAC_ID. As a result of the verification, if the written PAC_ID is sensible, determining that it is a case when the recording and reproducing device having written the data on the disc has a version identical to a version of the present recording and reproducing device, or a case when there is no separate writing/reproduction restrictions, the recording/reproduction is performed according to the order from the host 20.

When the sensing of a code written on the PAC_ID fails, determining that it is a case when there are restrictions due to reasons, such as the recording and reproducing device having written the data on the disc has a version different from a version of the present recording and reproducing device, the recording/reproduction is preformed according to the order from the host with reference to recording/reproduction restriction areas on the disc written on the "Unknown PAC rule" and "Segment". In this case, control operations are performed on the logical overwriting and the area in which data is logically overwritten. For this, the microcomputer 16 provides the position information and data according to the order of the host to the servo unit 14 and the data-processor 13, so that the recording/reproduction is finished at a desired position on the optical disc through the pickup unit 11.

The method and apparatus for recording and/or reproducing data to/from the recording medium have the following advantages. The definition of an accessible area of a disc of a related art version drive by using PACs permits robust protection of a data area having a user data recorded thereon, to cut off improper external access from a hacker or the like. Also, the PAC which manages entire data zone or the segment areas on the disc permits effective data recording and reproducing to/from the high density optical disc. Finally, by proposing a method for controlling logical overwriting and a method for controlling access of the logical overwriting area, the high density optical disc can effectively record and reproduce the data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium having a data structure for managing a data area of the recording medium, the recording medium comprising:
    a physical access control (PAC) cluster including information for managing logical overwriting to the recording medium, wherein the PAC cluster includes,
    a PAC header common to each PAC cluster; and
    a PAC specific information area including PAC information specific to each PAC cluster,
    wherein the PAC header includes,
    segment information identifying at least one segment area in a user data area of the recording medium, the number of the segment area identified by the segment information being less than or equal to a predetermined maximum number; and
    an unknown PAC rules field defining a rule used without considering the PAC information of the corresponding PAC cluster when the PAC cluster is not known to an apparatus attempting to record to or reproduce from the recording medium, the unknown PAC rules field including a logical-overwrite field indicating whether logical overwriting is allowable for the recording medium; and
    a defect management area having at least one defect list entry, the defect list entry including first position information for indicating a position of a defective area within the user data area, second position information for indicating a position of a replacement area to be assigned to the defective area, first status information for indicating whether the defective area is replaced with the replacement area, and second status information for indicating single clusters and pluralities of consecutive clusters included in the defective area, each cluster including a plurality of sectors.

2. The recording medium of claim 1, wherein the PAC header includes a PAC identification information (PAC ID) for identifying the corresponding PAC cluster.

3. The recording medium of claim 2, wherein the PAC identification information (PAC ID) is set to represent a "Logical Overwrite (LOW) PAC".

4. The recording medium of claim 1, wherein the PAC specific information area for each PAC cluster performs a specific function or application.

5. The recording medium of claim 4, wherein the specific function or application includes controlling access to areas of the recording medium.

6. The recording medium of claim 1, wherein the recording medium is a write-once recording medium.

7. The recording medium of claim 1, further comprising:
    a backup PAC cluster including a copy of the PAC cluster.

8. The recording medium of claim 1, wherein the unknown PAC rules field further includes an entire disc flag field indicating whether the rule is applicable to all of the segment area.

9. The recording medium of claim 1, wherein the defect management area is included in a lead-in area of the recording medium.

10. A method for reading and recording data in a recording medium, the method comprising:
    reading a physical access control (PAC) cluster and at least one defect list entry recorded on the recording medium, the PAC cluster including,
    a PAC header common to each PAC cluster; and
    a PAC specific information area including PAC information specific to each PAC cluster,
    wherein the PAC header includes,
    segment information identifying at least one segment area in a user data area of the recording medium, the number of the segment area identified by the segment information being less or equal to a predetermined maximum number;
    an unknown PAC rules field defining a rule used without considering the PAC information of the corresponding PAC cluster when the PAC cluster is not known to an apparatus attempting to record to or reproduce from the recording medium, the unknown PAC rules field including a logical-overwrite field indicating whether logical overwriting is allowable for the recording medium,
    the defect list entry including first position information for indicating a position of a defective area within the user data area, second position information for indicating a position of a replacement area to be assigned to the defective area, first status information for indicating whether the defective area is replaced with the replacement area, and second status information for indicating single clusters and pluralities of consecutive clusters included in the defective area, each cluster including a plurality of sectors;

determining whether logical overwriting is allowed based on the logical-overwrite field;

recording data on the recording medium by performing logical overwriting on a pre-recorded area of the recording medium, if the logical-overwrite field indicates that logical overwriting is allowable for the recording medium.

11. The method of claim 10, wherein the PAC cluster is recorded on at least one area within a lead-in area and a lead-out area of the recording medium.

12. The method of claim 10, wherein the logical overwrite field is allocated with 1 bit so as to indicate whether logical overwriting is allowable or not.

13. The method of claim 10, wherein the logical overwrite field is allocated with 2 bits so as to indicate whether physical overwriting and logical overwriting are allowable or not.

14. The method of claim 10, wherein the unknown PAC rules field further includes an entire disc flag field indicating whether the rule is applicable to all of the segment area.

15. A method for recording physical access control (PAC) information of the recording medium, the method comprising:

verifying a PAC area within the lead-in area of the recording medium; and recording a PAC cluster within the PAC area, the PAC cluster including;

a PAC header common to each PAC cluster; and a PAC specific information area including PAC information specific to each PAC cluster, wherein the PAC header includes, segment information identifying at least one segment area in a user data area of the recording medium, the number of the segment area identified by the segment information being less or equal to a predetermined maximum number;

an unknown PAC rules field defining a rule used without considering the PAC information of the corresponding PAC cluster when the PAC cluster is not known to an apparatus attempting to record to or reproduce from the recording medium, the rule including a logical-overwrite field indicating whether logical overwriting is allowable for the recording medium; and recording at least one defect list entry in a defect management area, the defect list entry including first position information for indicating a position of a defective area within the user data area, second position information for indicating a position of replacement area to be assigned to the defective area, first status information for indicating whether the defective area is replaced with the replacement area or not, and second status information for indicating single clusters and pluralities of consecutive clusters included in the defective area, the cluster including a plurality of sectors.

16. The method of claim 15, further comprising:

recording a backup PAC cluster including a copy of the PAC cluster in a backup area of the recording medium.

17. The method of claim 15, wherein the unknown PAC rules field further includes an entire disc flag field indicating whether the rule is applicable to all of the segment area.

18. An apparatus for recording data on a recording medium, the apparatus comprising:

an optical pickup configured to record data on the recording medium; and a controller configured to control the optical pickup to record a physical access control (PAC) cluster on the recording medium, wherein the PAC cluster includes:

a PAC header common to each PAC cluster; and a PAC specific information area including PAC information specific to each PAC cluster, wherein the PAC header includes:

segment information identifying at least one segment area in a user data area of the recording medium, the number of the segment area identified by the segment information being less or equal to a predetermined maximum number;

an unknown PAC rules field defining a rule used without considering the PAC information of the corresponding PAC cluster when the PAC cluster is not known to an apparatus attempting to record to or reproduce from the recording medium, the rule including a logical-overwrite field indicating whether logical overwriting is allowable for the recording medium, wherein the controller is configured to control the optical pickup to further record at least one defect list entry in a defect management area, the defect list entry including first position information for indicating a position of a defective area within the user data area, second position information for indicating a position of replacement area to be assigned to the defective area, first status information for indicating whether the defective area is replaced with the replacement area or not, and second status information for indicating single clusters and pluralities of consecutive clusters included in the defective area, the cluster including a plurality of sectors.

19. The apparatus of claim 18, wherein the controller is configured to control the optical pickup to record the PAC cluster on an inner circumference of the recording medium.

20. The apparatus of claim 18, wherein the unknown PAC rules field further includes an entire disc flag field indicating whether the rule is applicable to all of the segment area.

* * * * *